United States Patent
Cranston, III et al.

(10) Patent No.: US 6,354,869 B1
(45) Date of Patent: Mar. 12, 2002

(54) CABLE ATTACHMENT BRACKET WITH AN ATTACHMENT TAB

(75) Inventors: William V. Cranston, III, Boca Raton, FL (US); Philip E. Grady, Kannapolis; Jochem K. Koenig, Charlotte, both of NC (US); John E. McCloskey; James J. Tout, Jr., both of Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/607,307

(22) Filed: Jun. 29, 2000

(51) Int. Cl.⁷ .............................................. H01R 13/73
(52) U.S. Cl. ....................................... 439/544; 439/572
(58) Field of Search ................................. 439/544, 573, 439/572, 939; 361/801, 802, 759, 799, 800; 312/183, 187; 174/35 R

(56) References Cited

U.S. PATENT DOCUMENTS

| | | | | |
|---|---|---|---|---|
| 5,679,923 A | * | 10/1997 | Le | .............................. 174/35 R |
| 5,690,306 A | * | 11/1997 | Roesner | .................. 248/222.52 |
| 5,715,146 A | | 2/1998 | Hoppal | ......................... 361/796 |
| 5,833,494 A | * | 11/1998 | Diaz | ............................. 439/573 |
| 5,852,544 A | * | 12/1998 | Lee | .............................. 361/683 |
| 5,980,275 A | | 11/1999 | Beaman et al. | ................ 439/92 |
| 5,986,892 A | * | 11/1999 | Hargy, III | .................... 361/759 |
| 6,231,385 B1 | * | 5/2001 | Kuo | .............................. 439/557 |

* cited by examiner

Primary Examiner—Gary Paumen
Assistant Examiner—Ross Goshi
(74) Attorney, Agent, or Firm—Ronald V. Davidge; Richard A. Tomlin

(57) ABSTRACT

A connector is fastened to a central portion of a connector bracket adjacent a slot in a slotted bracket to provide a number of electrical circuits extending through the slot. A first end of the connector bracket is fastened to the slotted bracket by means of a screw. The central portion of the connector bracket extends inwardly along the slotted card bracket, adjacent the slot, which the central portion overlaps. An end tab of the card bracket, opposite the first end thereof, extends outwardly along a part of the slotted card bracket, which itself extends from an end of the slot.

3 Claims, 3 Drawing Sheets

CABLE ATTACHMENT BRACKET WITH AN ATTACHMENT TAB

BACKGROUND OF THE INVENTION

1. Field of the Invention

This invention relates to holding a bracket supporting the attachment of cables to connectors in place within a computing system, and, more particularly, to holding such a bracket in place within a conventional slotted bracket.

2. Background Information

FIG. 1 is a fragmentary cross-sectional elevation of a computing system including a mother board 10 and a conventional circuit card 12 having a tab 14 inserted within a card edge connector 16 of the mother board 10. The rear end 18 of the circuit card 12 includes a card bracket 20 attached to a slotted bracket 22, forming part of the computing system, by means of a screw 24. An individual slot 26 within the slotted bracket 22 provides a space through which an I/O connector 28 extends for attachment to an external cable (not shown). Thus the card 12 is rigidly held in place by the screw 24 near its top edge 30 and by the engagement of its tab 14 with the card edge connector 16 near its lower edge 32. The mother board 10 may be a relatively large system (or planar) board extending inwardly adjacent a cover 36 of the computing system. Alternately, the mother board 10 may be a riser board extending perpendicularly from the system (or planer) board to provide for the attachment of one or more circuit cards 12.

Some applications require the mounting of a connector bracket (not shown) to provide an I/O connector extending through the a slot 26 in the slotted bracket 22 in a position not corresponding to that of a card 12 attached to a connector 16 of the mother board 10. For example, a circuit card 12 may require a provision for so many connections to external peripheral devices that such connections cannot all be made through connectors attached to the card bracket 20. In such an application, a connector bracket, similar in shape to a card bracket 20 but lacking means for attachment to a card, has been used to support the mounting of I/O connectors for the attachment of external cables. The connector bracket is mounted to extend adjacent a slot 26 adjacent the slot 26 at which the circuit card 12 is mounted.

Since the connector bracket is not connected to the card, except by means of flexible cables, the connector bracket is attached to the frame of the computing system only by the single screw 24 at the top of the connector bracket. In particular, the flexibility of the conventional connector bracket allows the force required to push a cable connector in place over the I/O connector 28 of the circuit card to deform the bracket 20 in a manner displacing the bracket inward. Except for the upper end of connector bracket, where the bracket is fastened in place by screw 24, the connector bracket is easily bent inward, in the direction of arrow 34, with the lower end 37 of the connector bracket moving freely inward from the adjacent section 38 of the slotted bracket 22.

This situation causes particular difficulties when a cable connector, such as a round DIN connector, is pushed onto a mating connector attached to a connector bracket of this sort, not physically supported by a circuit card 12. The connector bracket may become misaligned in a manner preventing the installation of the cable connector on the card connector due to mechanical interference with an edge of the slot 22 in the slotted bracket 20. After the connector bracket is pushed inward, there is no way to pull it back out, except by removing a cover of the computing system to manually access the inner side of the connector bracket, in a process which is, at best, inconvenient. The connector bracket then has to be pushed back into place with the cover removed and held as the cable connector is reinstalled. Even after this procedure has been completed, the connector bracket is not rigidly held in place, and the connector bracket may become bent or twisted if the cable is pulled, plugged into the connector bracket, or unplugged from the connector bracket.

Thus, what is needed is a means for rigidly holding a connector bracket in place on the slotted bracket. Since the interface between cards and brackets in computing systems has been widely standardized as a part of what has become known as an Industry Standard Architecture (ISA), with hundreds of different types of computing systems providing a standard interface for adapter cards, it is particularly useful to maintain compatibility with the standard slotted bracket.

3. Description of the Prior Art

The patent literature includes a number of examples of devices for fastening circuit cards in place in ISA circuit card, or expansion board, configurations. For example, U.S. Pat. No. 5,715,146 describes the use of a first card guide to hold the ends of a number of such cards, opposite the card brackets thereof, in alignment, while a second card guide is used to hold lateral edges of these cards, extending between the ends and opposite the card edge connectors, also in alignment. Edge tabs from the cards extend into these connectors on the mother board. What is needed is a way to modify the card brackets so that they can be used to hold the cards in alignment without attachment to the card edge connectors and without additional, external card guide structures.

U.S. Pat. No. 5,980,275 describes a card bracket (not ISA) fastened to a mezzanine card, which is in turn fastened to a circuit card. What is needed is a method for fastening a circuit card in place with a dedicated bracket, mechanically independent from other cards and brackets.

SUMMARY OF THE INVENTION

According to a first aspect of the invention, there is provided a connector bracket for mounting a circuit connector to a slotted bracket in order to provide a number of electrical circuits extending through a slot within the slotted bracket. The connector bracket includes a first attachment surface, a central portion, an end tab and connector attachment means. The first attachment surface, disposed at a first end of the connector bracket, is for attaching the connector bracket to the slotted bracket with a fastener. The central portion extends inwardly adjacent the slotted bracket along the slot and overlapping the slot. The end tab, which is opposite the first end of the connector bracket, extends outwardly adjacent a portion of the slotted bracket extending from an end of the slot. The connector attachment means is for attaching the circuit connector to the connector bracket.

DETAILED DESCRIPTION

Figure 1:
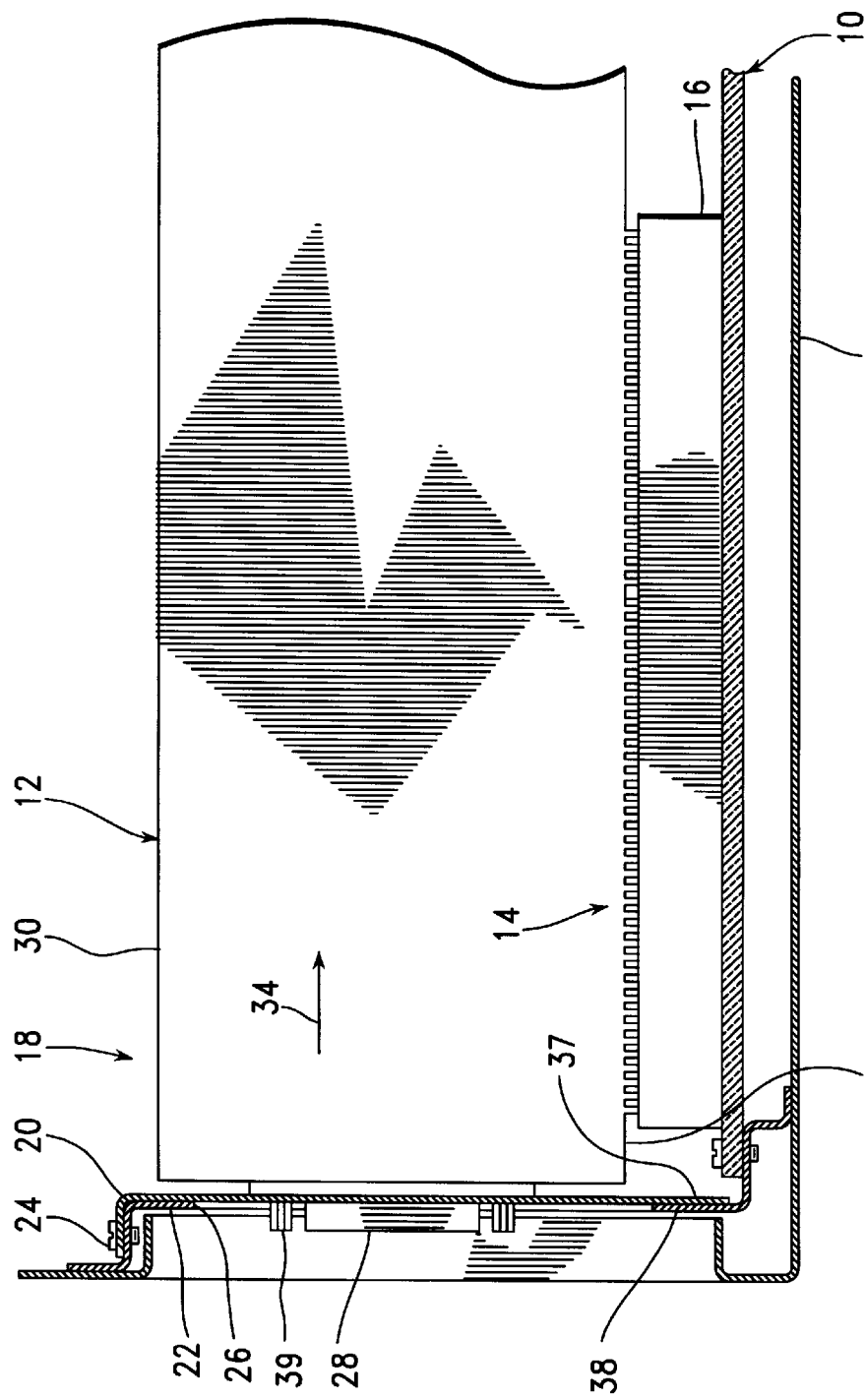
FIG. 1 is a fragmentary cross-sectional vertical elevation of a computing system including a mother board and a conventional circuit card having a tab inserted within a card edge connector of the mother board.
Figure 3:
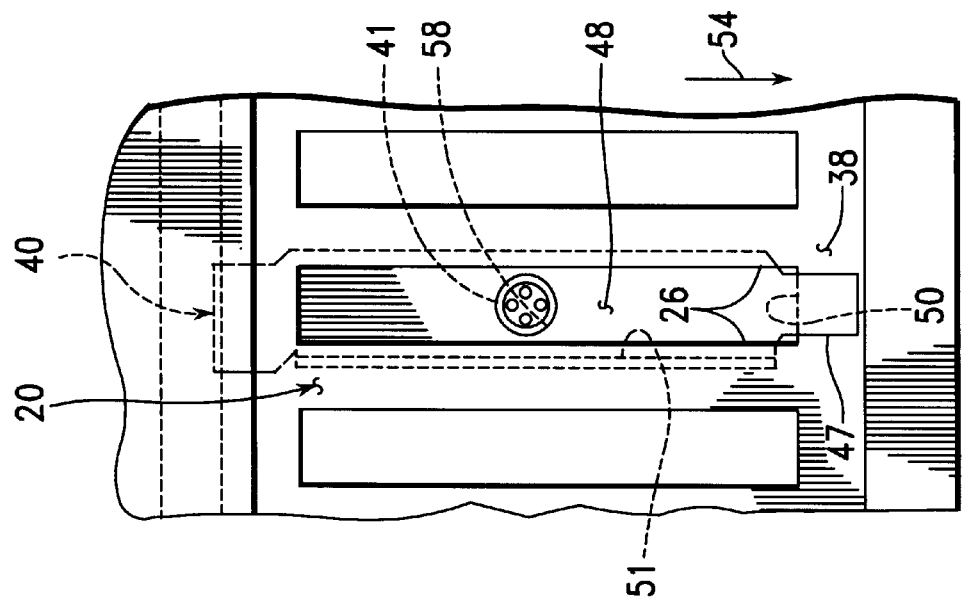
FIG. 3 is a fragmentary rear view of the apparatus of FIG. 2.
Figure 2:
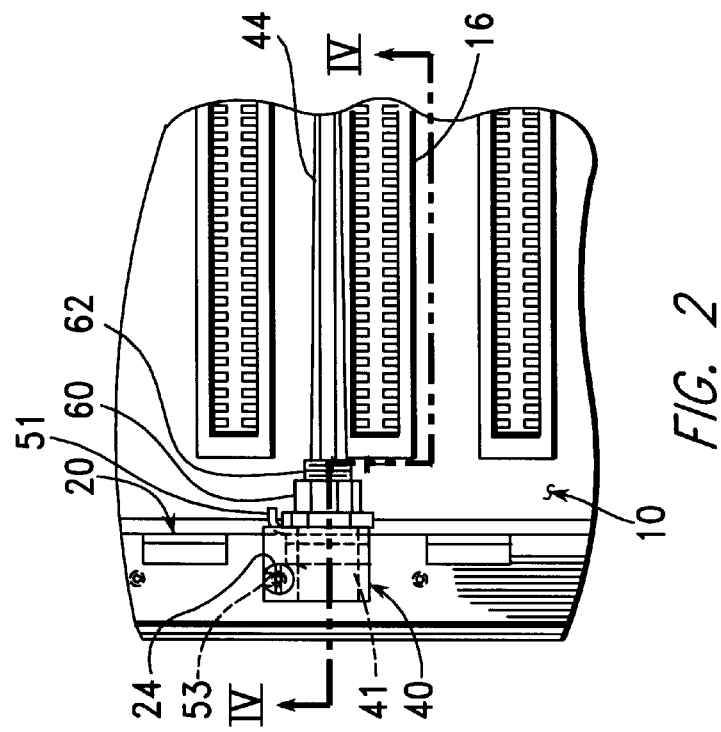
FIG. 2 is a fragmentary plan view of a computing system including a connector bracket built in accordance with the present invention.
Figure 4:
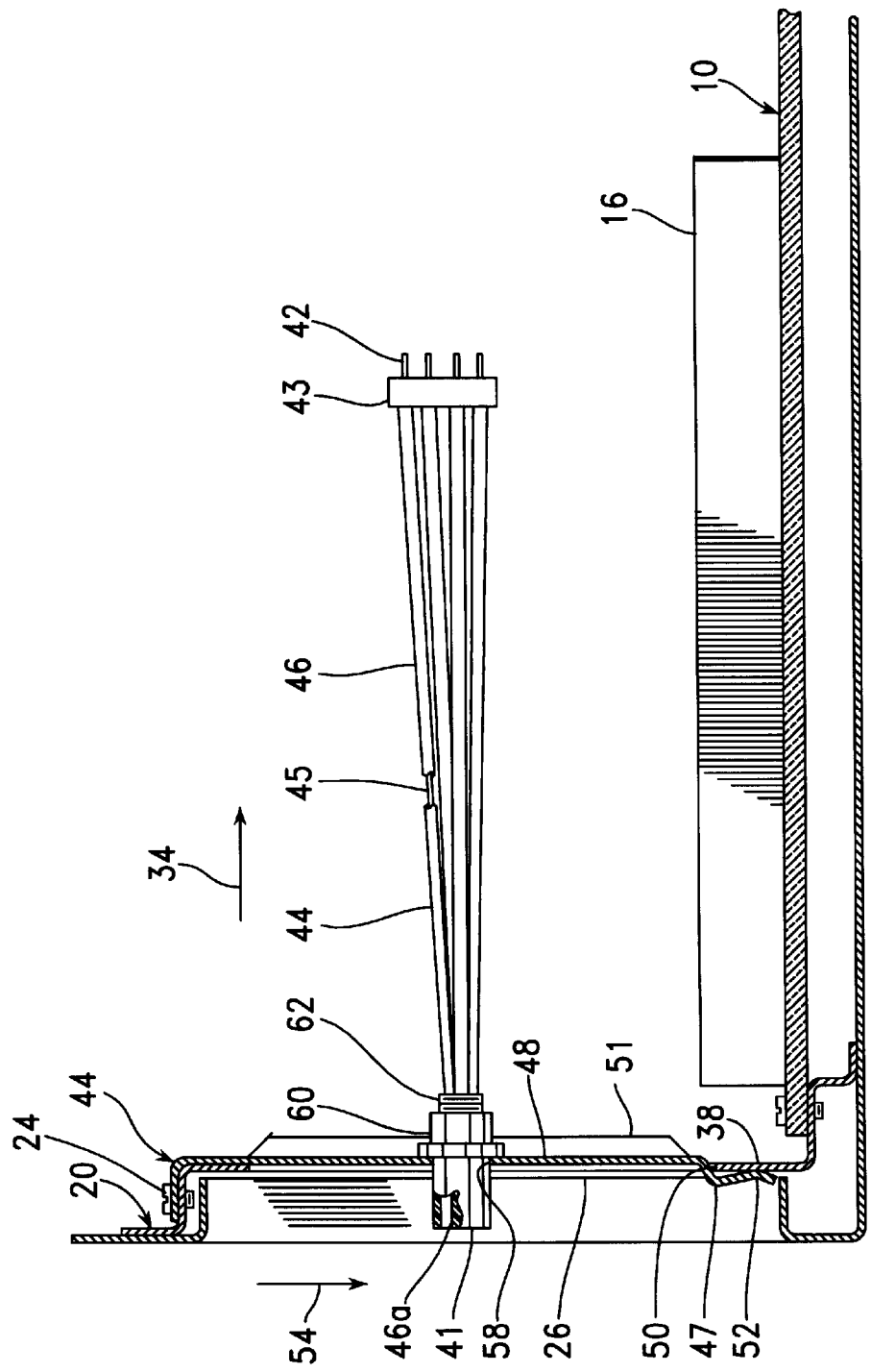
FIG. 4 is a fragmentary cross-sectional vertical elevation of the apparatus of FIG. 3, taken as indicated by section lines IV—IV.

FIGS. 2–4 show a conventional computer system, generally as described above in reference to FIG. 1, having an installed connector bracket 40 built in accordance with the present invention, with FIG. 2 being a fragmentary plan view, with FIG. 3 being a fragmentary rearview, and with FIG. 4 being a fragmentary cross-sectional vertical elevation.

A connector 41, fastened within the connector bracket 40 is provided to allow the establishment of electrical circuits extending through a slot 26 of the slotted bracket 22. Electrical connections are made within the computing system to the various pins 42 of an internal connector 43 forming part of a cable assembly 44 extending inward, in the direction of arrow 34, from the connector 41. A conductor 45 within each of the wires 46 of the cable assembly 44 provides an electrical connection between an associated pin 42 of the cable connector 43 and a contact 46a of the connector 41. The electrical connections to the connector 41 held by the installed connector bracket 40 are thus made through the flexible attached cable 42, which fails to provide a substantial force holding the connector bracket 40 in place. This situation contrasts with the arrangement described above in reference to FIG. 1, in which the card bracket 20 is held in place by a circuit card 12, which is in turn held by means of engagement with a card edge connector 16 forming part of the motherboard 10.

Therefore, the connector bracket 40 includes a lower tab 47 extending outwardly along a lower portion 38 of the conventional slotted bracket 20. A remaining portion 48 of the connector bracket 40 extends inwardly along the slotted bracket 20, overlapping the edges of slot 26 so that the lower end of the connector bracket 40 is trapped on a lower edge 50 of the slot 26. A flange 51 is provided is added to increase the stiffness of this portion 48 of the connector bracket 40. The lower tab 47 is preferably formed to extend outward, opposite the direction of arrow 34 and then inward to form a portion 52 held in contact with the lower portion 48 of the slotted bracket 20 by deflection of the lower tab 47. The mounting screw 24, extending through a slot 53 in the connector bracket 40 to engage the slotted bracket 20, holds the connector bracket 40 downward, in the direction of arrow 54, over the lower edge 50 of the slot 26.

In general, the connector is mechanically fastened to the connector bracket at or adjacent the connector. In the example of FIGS. 2–4, a round connector 41 extends through a hole 58 within the connector bracket 40, being fastened within the hole 58 by means of a nut 60 engaging a threaded portion 62 of the connector 41. Alternately, for example, a connector of the type shown FIG. 1 in may be installed within the connector bracket, with screw terminals 39 being used both the fasten the card bracket in place on the card connector and to fasten (with additional screws) a cable connector to the card connector. In either case, a suitable aperture, such as hole 58, is provided to allow the connector to extend through the connector bracket.

While the flange 51 is shown as extending inward from a particular edge of the portion 48 of the connector bracket 40, it is understood that the flange 51 can alternately extend inward from the opposite edge of the portion 48, or that flanges can extend inward from both edges of the portion 48.

While the present invention has been described as useful for holding the connector bracket 40 in place within a computing system, it is understood that brackets of this type are also used to provide electrical grounding in a manner consistent with reducing electromagnetic emissions for compatibility with other electronic devices, and that the present invention substantially enhances the electrical grounding provided by the bracket by implementing reliable grounding contact at each end of the bracket.

While the invention has been described in its preferred forms or embodiments with some degree of particularity, it is understood that this description has been given only by way of example, and that numerous changes in the details of construction, fabrication, and use, including the combination and arrangement of parts, may be made without departing from the spirit and scope of the invention.

What is claimed is:

1. A connector bracket for mounting a circuit connector to a slotted bracket to provide a plurality of electrical circuits extending through a slot within said slotted bracket, wherein said connector bracket comprises:

a central portion including an aperture for holding said circuit connector;

a first tab extending in an outward direction at a first end of said central portion, wherein said first tab includes a slot for attaching said connector bracket to said slotted bracket with a fastener;

a second tab at a second end of said central portion, opposite said first end thereof, extending away from said central portion, and offset in said outward direction from said central portion, wherein a portion of said second tab extends.

2. The connector bracket assembly of claim 1, wherein said central portion has a flat section including said aperture for holding said circuit connector and a flange extending along said central portion in an inward direction.

3. Apparatus comprising:

an enclosure including a slotted bracket including a slot;

a connector bracket including a central portion having an aperture, wherein said central portion extends across said slot and inwardly adjacent said slotted bracket, a first tab extending in an outward direction at a first end of said central portion, and a second tab at a second end of said central portion, opposite said first end thereof, extending away from said central portion, and offset in said outward direction from said central portion to extend outwardly adjacent said slotted bracket;

a fastener holding said first tab against said slotted bracket, wherein a portion of said second tab extends outward from said central portion and inward with increasing distance from said central portion to contact said slotted bracket;

a connector extending within said aperture in said central portion, including a plurality of contacts exposed in said outward direction;

connector attachment means attaching said circuit connector to said connector bracket; and a plurality of wires intending in an inward direction from said connector, wherein each wire in said plurality of wires is electrically connected to a contact within said plurality of contacts.

* * * * *